United States Patent
Hsieh et al.

(10) Patent No.: US 8,699,812 B2
(45) Date of Patent: Apr. 15, 2014

(54) SYSTEM AND METHOD FOR QUALITY IMPROVEMENT IN CT IMAGING

(75) Inventors: Jiang Hsieh, Brookfield, WI (US); Sandeep Dutta, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 333 days.

(21) Appl. No.: 13/156,586

(22) Filed: Jun. 9, 2011

(65) Prior Publication Data
US 2012/0314922 A1  Dec. 13, 2012

(51) Int. Cl.
*G06K 9/40* (2006.01)
(52) U.S. Cl.
USPC ........... 382/254; 382/128; 382/260; 382/274; 382/275; 358/3.26; 358/3.27; 358/463
(58) Field of Classification Search
USPC .................. 382/128, 131, 132, 260, 274, 275; 358/3.26, 3.27, 463
See application file for complete search history.

(56) References Cited

U.S. PATENT DOCUMENTS

| | | | | |
|---|---|---|---|---|
| 5,436,952 A | * | 7/1995 | Haendle et al. | 378/98.7 |
| 7,342,218 B2 | * | 3/2008 | Almogy et al. | 250/234 |
| 7,365,836 B2 | * | 4/2008 | Some | 356/237.4 |
| 7,423,302 B2 | * | 9/2008 | Dosluoglu et al. | 257/233 |
| 7,425,719 B2 | * | 9/2008 | Treves et al. | 250/559.45 |
| 7,436,508 B2 | * | 10/2008 | Wolters et al. | 356/237.5 |
| 7,440,092 B2 | * | 10/2008 | Shibata et al. | 356/237.2 |
| 7,756,312 B2 | | 7/2010 | Hsieh et al. | |
| 7,833,814 B2 | * | 11/2010 | Dosluoglu et al. | 438/48 |
| 7,903,249 B2 | * | 3/2011 | Yoshida et al. | 356/445 |
| 8,077,306 B2 | * | 12/2011 | Kawaguchi | 356/237.1 |

* cited by examiner

*Primary Examiner* — Yosef Kassa
(74) *Attorney, Agent, or Firm* — Ziolkowski Patent Solutions Group, SC

(57) ABSTRACT

A non-transitory computer readable storage medium having stored thereon a computer program comprising instructions, which when executed by a computer, cause the computer to acquire an image comprising image data reconstructed from an imaging device. The instructions further cause the computer to apply a bloom reduction algorithm to the image configured to iteratively reduce a blooming of high-density objects in the image.

20 Claims, 4 Drawing Sheets

SYSTEM AND METHOD FOR QUALITY IMPROVEMENT IN CT IMAGING

BACKGROUND OF THE INVENTION

Embodiments of the invention relate generally to medical or non-medical imaging and, more particularly, to a system and method for iterative resolution recovery in diagnostic imaging such as, x-ray, MR, and CT imaging.

Typically, in computed tomography (CT) imaging systems, an x-ray source emits a fan-shaped beam toward a subject or object, such as a patient or a piece of luggage. Hereinafter, the terms "subject" and "object" shall include anything capable of being imaged. The beam, after being attenuated by the subject, impinges upon an array of radiation detectors. The intensity of the attenuated beam radiation received at the detector array is typically dependent upon the attenuation of the x-ray beam by the subject. Each detector element of the detector array produces a separate electrical signal indicative of the attenuated beam received by each detector element. The electrical signals are transmitted to a data processing system for analysis which ultimately produces an image.

Generally, the x-ray source and the detector array are rotated about the gantry within an imaging plane and around the subject. X-ray sources typically include x-ray tubes, which emit the x-ray beam at a focal point. X-ray detectors typically include a collimator for collimating x-ray beams received at the detector, a scintillator for converting x-rays to light energy adjacent the collimator, and photodiodes for receiving the light energy from the adjacent scintillator and producing electrical signals therefrom.

Typically, each scintillator of a scintillator array converts x-rays to light energy. Each scintillator discharges light energy to a photodiode adjacent thereto. Each photodiode detects the light energy and generates a corresponding electrical signal. The outputs of the photodiodes are then transmitted to the data processing system for image reconstruction.

Spatial resolution affects image clarity and diagnostic quality of a CT image. High spatial resolution CT images are generally desired; however, spatial resolution may be degraded in a CT image due to any of multiple sources of resolution degradation. For example, when designing a reconstruction kernel, the balance between spatial resolution and noise is typically addressed. In general, a higher spatial resolution kernel leads to higher noise in the reconstructed image, and the tradeoff between the two is not linear. That is, the increase in noise is much faster than an increase in the spatial resolution. As a result, the spatial resolution of a CT study generally has to be artificially lowered in order to make sure the object-of-interest is not masked out by the noise in the image. The artificial lowering of spatial resolution often leads to undesirable features such as blooming in a reconstructed image from certain objects (e.g., calcified plaque or stent) or bright areas of the image. Such blooming may inflate measurements of a particular tissue, causing the object to appear larger in size than it really is.

Therefore, it would be desirable to design a system and method that reduces blooming artifacts in reconstructed images without significant increase in image noise.

BRIEF DESCRIPTION OF THE INVENTION

According to one aspect of the invention, a non-transitory computer readable storage medium having stored thereon a computer program comprising instructions, which when executed by a computer, cause the computer to acquire an image comprising image data reconstructed from an imaging device. The instructions further cause the computer to apply a bloom reduction algorithm to the image configured to iteratively reduce a blooming of high-density objects in the image.

According to another aspect of the invention, a method for reducing blooming in an image reconstructed from an imaging device comprises obtaining the image and iteratively applying a bloom-reducing technique to high-density object data in the image to generate a bloom-reduced image. The method also comprises displaying the bloom-reduced image on a display.

According to yet another aspect of the invention, a CT system comprises a rotatable gantry having an opening to receive an object to be scanned, a high frequency electromagnetic energy projection source configured to project a high frequency electromagnetic energy beam toward the object, and a detector array having a plurality of detector cells wherein each cell is configured to detect high frequency electromagnetic energy passing through the object. The CT system also comprises a data acquisition system (DAS) connected to the detector array and configured to receive outputs from the detector cells and an image reconstructor connected to the DAS and configured to reconstruct an image of the object from the outputs received by the DAS. The CT system further comprises a computer programmed to iteratively reduce a bloom artifact in the reconstructed image caused by reconstructing high-density object data into image data.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

The operating environment of the invention is described with respect to a sixty-four-slice computed tomography (CT) system. However, it will be appreciated by those skilled in the art that the invention is equally applicable for use with other multi-slice configurations. Moreover, the invention will be described with respect to the detection and conversion of x-rays. However, one skilled in the art will further appreciate that the invention is equally applicable for the detection and conversion of other high frequency electromagnetic energy. In addition, the invention can be applied to non-tomographic devices such as x-ray radiograph or MR imaging. Embodiments of the invention will be described with respect to a "third generation" CT scanner, but is equally applicable with other CT systems.

Figure 1:
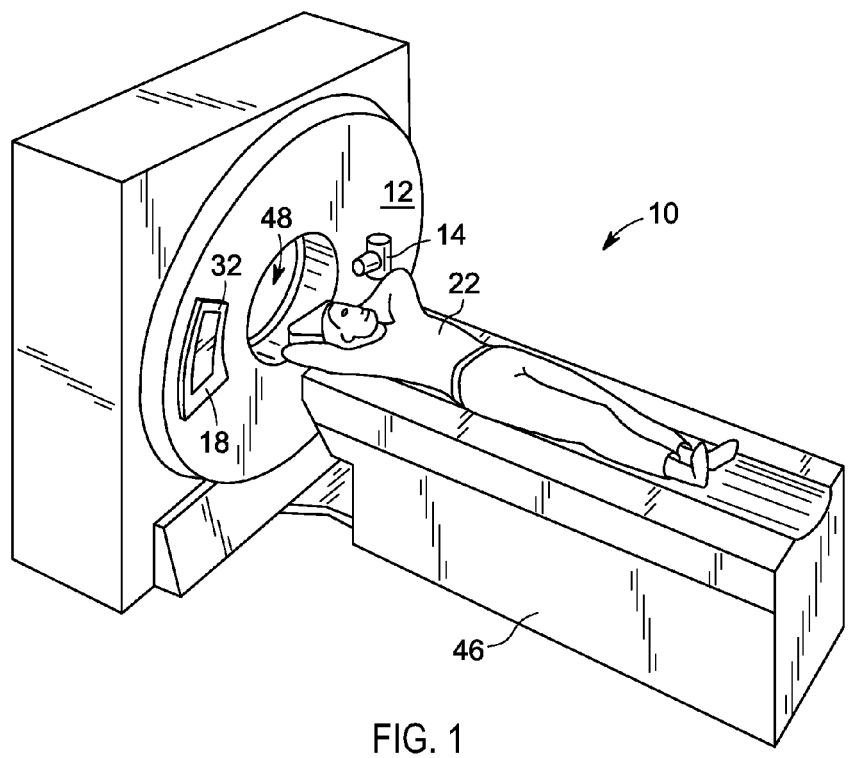
FIG. 1 is a pictorial view of a CT imaging system.
Figure 2:
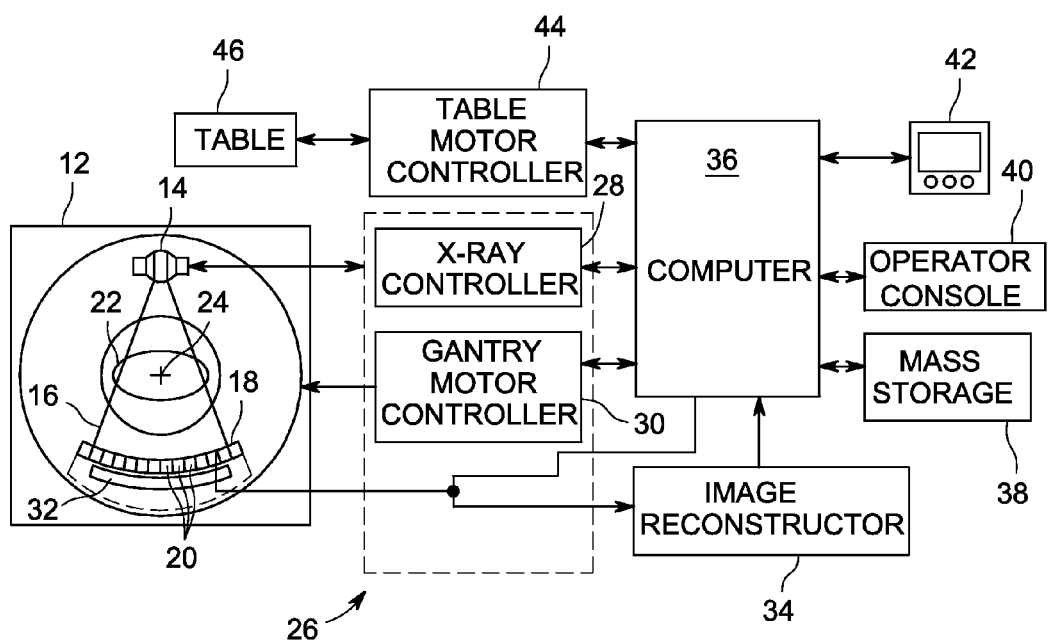
FIG. 2 is a block schematic diagram of the system illustrated in FIG. 1.

Referring to FIG. 1, a computed tomography (CT) imaging system 10 is shown as including a gantry 12 representative of a "third generation" CT scanner. Gantry 12 has an x-ray source 14 that projects a beam of x-rays toward a detector assembly or collimator 18 on the opposite side of the gantry 12. Referring now to FIG. 2, detector assembly 18 is formed by a plurality of detectors 20 and data acquisition systems (DAS) 32. The plurality of detectors 20 sense the projected x-rays 16 that pass through a medical patient 22, and DAS 32 converts the data to digital signals for subsequent processing. Each detector 20 produces an analog electrical signal that represents the intensity of an impinging x-ray beam and hence the attenuated beam as it passes through the patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to an x-ray source 14 and a gantry motor controller 30 that controls the rotational speed and position of gantry 12. An image reconstructor 34 receives sampled and digitized x-ray data from DAS 32 and performs high speed reconstruction. The reconstructed image is applied as an input to a computer 36 which stores the image in a mass storage device 38.

Computer 36 also receives commands and scanning parameters from an operator via console 40 that has some form of operator interface, such as a keyboard, mouse, voice activated controller, or any other suitable input apparatus. An associated display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 and gantry 12. Particularly, table 46 moves patients 22 through a gantry opening 48 of FIG. 1 in whole or in part.

Figure 3:
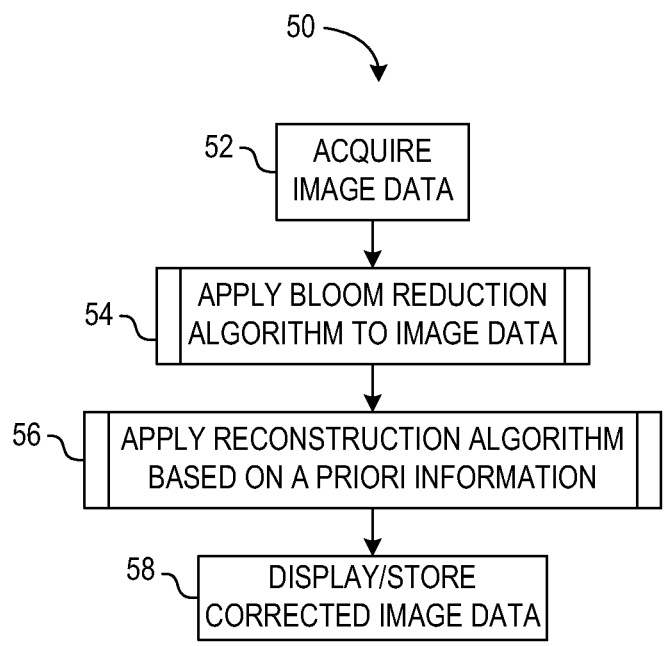
FIG. 3 is a flowchart showing a technique for reducing blooming artifacts in images according to an embodiment of the invention.

FIG. 3 is a flowchart showing a technique 50 for reducing blooming artifacts in images according to an embodiment of the invention. As used herein, "blooming" refers to the apparent enlargement of an object in a reconstructed image. The blooming effect may be observed at locations of high-density objects in the image.

Technique 50 begins with the acquisition of image data at block 52. In one embodiment of the invention, the image data is acquired as part of an x-ray or CT scan of an object. The scan may include acquiring x-ray data and reconstructing the data into an image. According to another embodiment of the invention, the image data may be obtained of a prior scanned image from an image storage database located on an image storage server or other computer readable storage medium.

At block 54, an algorithm for reducing high-density object blooming using an iterative process is performed on the acquired image data. The bloom reduction algorithm 54 is described below with respect to FIG. 4. According to an embodiment of the invention, a priori knowledge obtained during application of the bloom reduction algorithm to image data of a first image may be applied in a reconstruction algorithm at block 56 as described with respect to FIG. 6 to reconstruct acquired x-ray data from an x-ray or CT scan into a second image to enhance reconstructed non-high-density object data that has been affected by the blooming of the high-density objects in the first image. A priori knowledge obtained with phantom and other calibration studies can also be applied to all images. Application of the reconstruction algorithm 56, however, is optional. At 58, the first and/or second images may be stored to an image storage database or displayed to a user.

Figure 4:
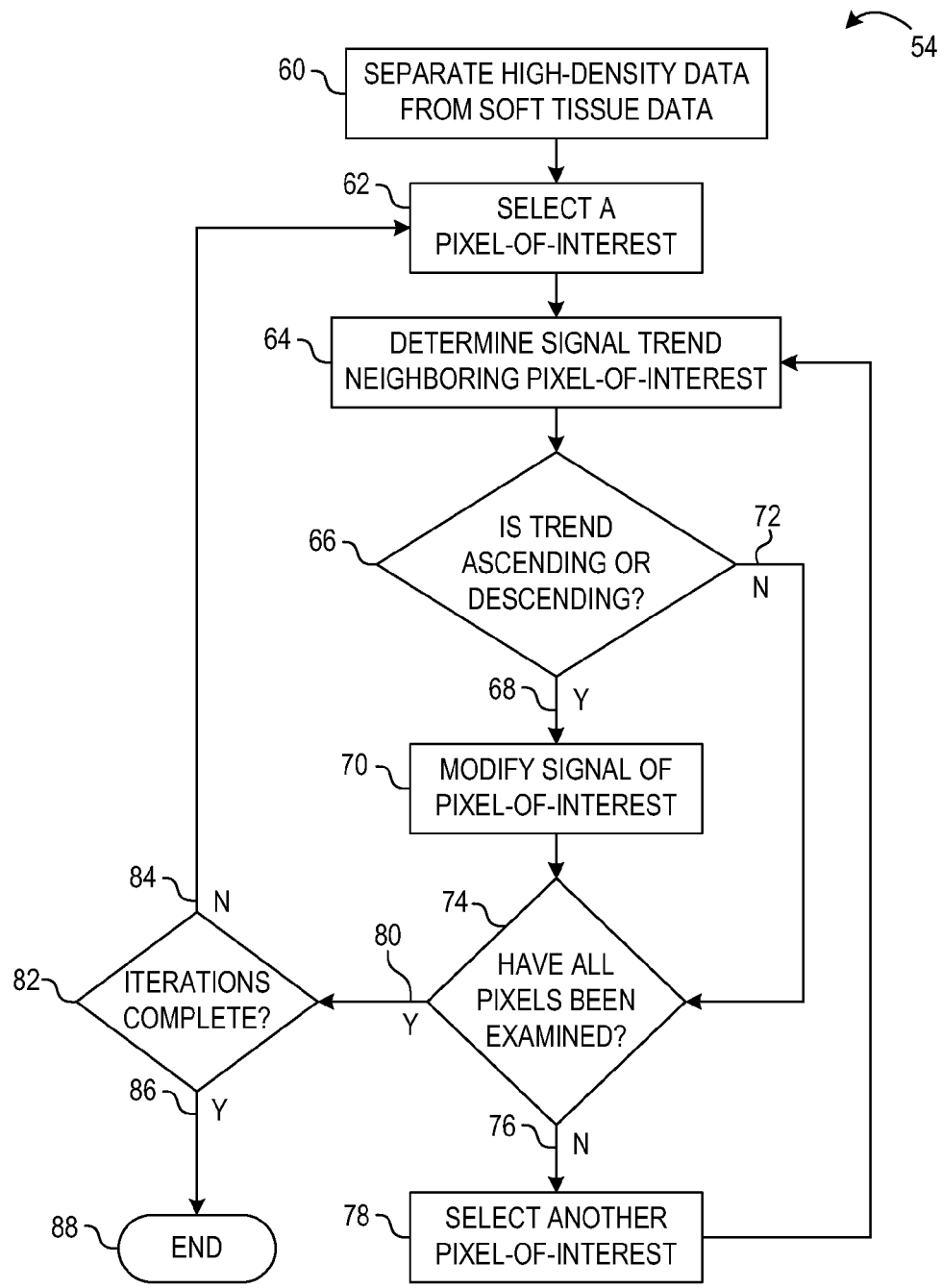
FIG. 4 is a flowchart showing the bloom reduction algorithm of FIG. 3 according to an embodiment of the invention.

FIG. 4 illustrates the bloom reduction algorithm 54 of FIG. 3 according to an embodiment of the invention. At block 60, high-density object data is separated from soft-tissue object data. According to one embodiment, the high-density object data may be separated from soft-tissue object data by calculating a normalized local variation. According to another embodiment, the high-density object may be separated from soft-tissue by its intensity value. In yet another embodiment, the high-density object can be identified based on its shape and size. In yet another embodiment, the high-density object can be identified based on its material composition, which can be arrived from the dual-energy CT imaging or spectral imaging. In yet another embodiment, the high-density object can be identified by the operator.

Let p(x, y) denote a reconstructed image pixel intensity, σ(x, y) the measured standard deviation at the pixel location (x, y), and ξ the global noise estimate for the entire image. Note that in this notation, while a two-dimensional variable is used, and it should be understood that the same process can be easily expanded to a three dimensional variable. A normalized local variation, τ(x, y), can be calculated by the following equation:

$$\tau(x, y) = \frac{\sigma(x, y) - \lambda_L \xi}{(\lambda_H - \lambda_L)\xi}, \quad \text{(Eqn. 1)}$$

where $0 \leq \tau(x, y) \leq 1$ and where lamda-$_L$ and lamda-$_H$ are parameters determined based on experimental values determined via, for example, phantom and clinical experiments. In the preferred embodiment, they are 1 and 2, respectively. Another map, k(x, y)=1 iff p(x, y)>T, where T is a threshold selected based on the soft-tissue value (e.g., T=225).

The product of the two determines that likelihood of a particular pixel is soft-tissue or high-density object. That is, a predetermined threshold (e.g., 0.5) can be used to separate the object. When the value exceeds 0.5, it is determined to be high-density object.

According to another embodiment, the high-density object data may be separated from soft-tissue object data by using a fuzzy logic algorithm on the image data. That is, there is no "hard threshold" determined to separate the two classes of object: high-density and soft-tissue. The product of the two values determine the probability that a particular pixel belongs. For example, a value of 0.4 means that the pixel can be assigned to soft-tissue with 40% probability and to high-density object with 60% probability.

According to another embodiment, the high-density object data may be separated from soft-tissue object data by manual input from a user. In this embodiment, the acquired image may be displayed on a display to the user. Then, high-density regions may be identified by the user by an input from the user encircling the high-density objects. In another embodiment, the user input may indicate a user-selected region to which a region-growing algorithm may be applied to expand the user-selected region to encompass the high-density object.

According to another embodiment, the high-density object data may be separated from soft-tissue object data based on acquired dual-energy x-ray or CT data. In dual-energy CT, material-decomposed images can be reconstructed. That is, equivalent-density images of a pair of basis-materials may be generated. Based on these density images, mono-energy images can be generated that simulate an image reconstructed with a CT device with mono-energetic x-rays, or effective-z image. These images can be used to identify the material inside the scanned object. Based on the nature of this material, the object can be separated from the soft-tissue.

Figure 5:
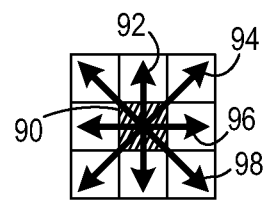
FIG. 5 is a schematic block diagram of a pixel neighborhood according to an embodiment of the invention.

Once the signal between the high-density objects and the soft-tissue is separated at block 60, the image pixels corresponding to the identified high-density object regions are subjected to an iterative edge enhancement process. That is, to reduce blooming, the edges of the identified high-density objects are modified to more closely resemble the actual size and/or shape of the high-density object in the image. At block 62, a pixel-of-interest corresponding to a pixel of the high-density object in the image data is selected. To guard against accidental enhancement of the sharp spikes caused by noise in the image, the general trend of the signal in the neighborhood of a pixel-of-interest is determined at block 64. If a signal intensity change is detected and is a part of the high-density object, it is more likely that the pixels along a particular direction follow either an ascending order or a descending order. Referring to FIG. 5 as an example, if a 3×3 neighborhood around a pixel-of-interest 90 is used, then the three pixels along a straight line will be used. It is contemplated that neighborhoods of other sizes (such as a 5×5 neighborhood or a 7×7 neighborhood) may also be used. There are four testing directions: north-south 92, northeast-southwest 94, east-west 96, and northwest-southeast 98.

Referring back to FIG. 4, the trend of signal intensities about the pixel-of-interest may show that the signal intensity of the pixel-of-interest is between the neighboring pixels along any of the testing directions 68-74. Accordingly, the bloom reduction algorithm 54 determines whether an ascending (increasing) or descending (decreasing) neighborhood trend exists along any of the testing directions 68-74 at block 66. In one embodiment, the order that the testing directions 68-74 are used may be weighted based on the local point spread function (PSF).

If so 68, modification to the intensity of the current pixel-of-interest is performed at block 70 based on the following equation:

$$\frac{\partial p_t(x, y)}{\partial t} = -\alpha \tau(x, y) |\nabla p_t(x, y)| G[\beta \nabla (x, y, t)^2], \quad \text{(Eqn. 2)}$$

where t is a variable representing the iteration, $\nabla$ is a gradient operator at the pixel-of-interest along one of the four testing directions 68-74, $\alpha$ is parameter to adjust for the correction strength (e.g., $\alpha$=0.2 in one embodiment), and (x, y, t) are known parameters obtained from the PSF of the image reconstruction system. G is a monotonically decreasing function. For example, G can be a negative exponential function [G(x)=exp(−x)]. $\beta$ is defined by the following equation:

$$\beta = \left(\frac{s\sigma_R}{\mu_C - \mu_W}\right)^2. \quad \text{(Eqn. 3)}$$

Here, s is an imperially determined scaling variable (e.g., s=4 in one embodiment), $\sigma_R$ is the reference noise level for ease of parameter tuning (e.g., $\sigma_R$=10.5 in one embodiment), $\mu_W$ is the CT number of water (e.g., $\mu_W$=1000 in one embodiment), and $\mu_C$ is the CT numbers for high-density objects. The value of $\mu_C$ can change from iterative to iteration to ensure proper edge response. For example, in an embodiment, the values for three iterations may be 1400, 1500, and 1600, respectively. Additional constraint can be placed on the pixel intensity modification. One of the constraints is the "conservation of energy". That is, when the pixel-of-interest intensity value is increased, its neighing pixel intensities are decreased properly to ensure that overall energy remains roughly the same.

Following modification of the signal of the pixel-of-interest or following a determination at block 66 that no ascending or descending neighborhood trend exists 72 along any of the testing directions 68-74, the bloom reduction algorithm 54 determines whether all the identified high-density object pixels of the image have been examined at block 74. If not 76, another pixel-of-interest is selected at block 78, and process control returns to block 64 to determine the signal trend in the neighborhood of the newly selected pixel-of-interest.

If all the identified high-density object pixels of the image have been examined for the current iteration 80, the bloom reduction algorithm 54 determines whether to perform another iteration or whether the iterations are complete at block 82. According to an embodiment of the invention, the determination to perform another iteration may be based on a comparison of the most recent iteration with the previous iteration. If a change between the iterations meets a certain threshold, then the bloom reduction algorithm 54 may determine that the iterations are complete. For example, if a change to the $|\nabla p_t(x, y)|$ term of Eqn. 2 meets or crosses a threshold, iterations may be complete. According to another embodiment, the number of iterations may be based on a known or predetermined number of iterations to be completed. In one example, the number of iterations may be determined based on a PSF known or acquired from the system used to reconstruct the image data.

According to yet another embodiment, the process image is convolved with the PSF of the CT system to arrive at a "bloomed" image. This image is then compared against the original image (unprocessed). If the "bloomed" image contains more blooming effect than the original, it indicates that the additional blooming reduction process needs to be performed and additional iteration needs to be conducted. If the level of blooming effect between the "bloomed" and original image is roughly the same, no additional iteration is performed. If the "bloomed" image contains less blooming effect than the original image, overcorrection has occurred. In this case, the parameters used in the previous iteration is modified and the last processing is repeated with the new set of parameters.

If the bloom reduction algorithm 54 determines that another iteration should be performed 84, process control returns to block 62, and another iteration is performed on all the previously-determined high-density object pixels. If not 86, algorithm 54 ends at block 88.

Figure 6:
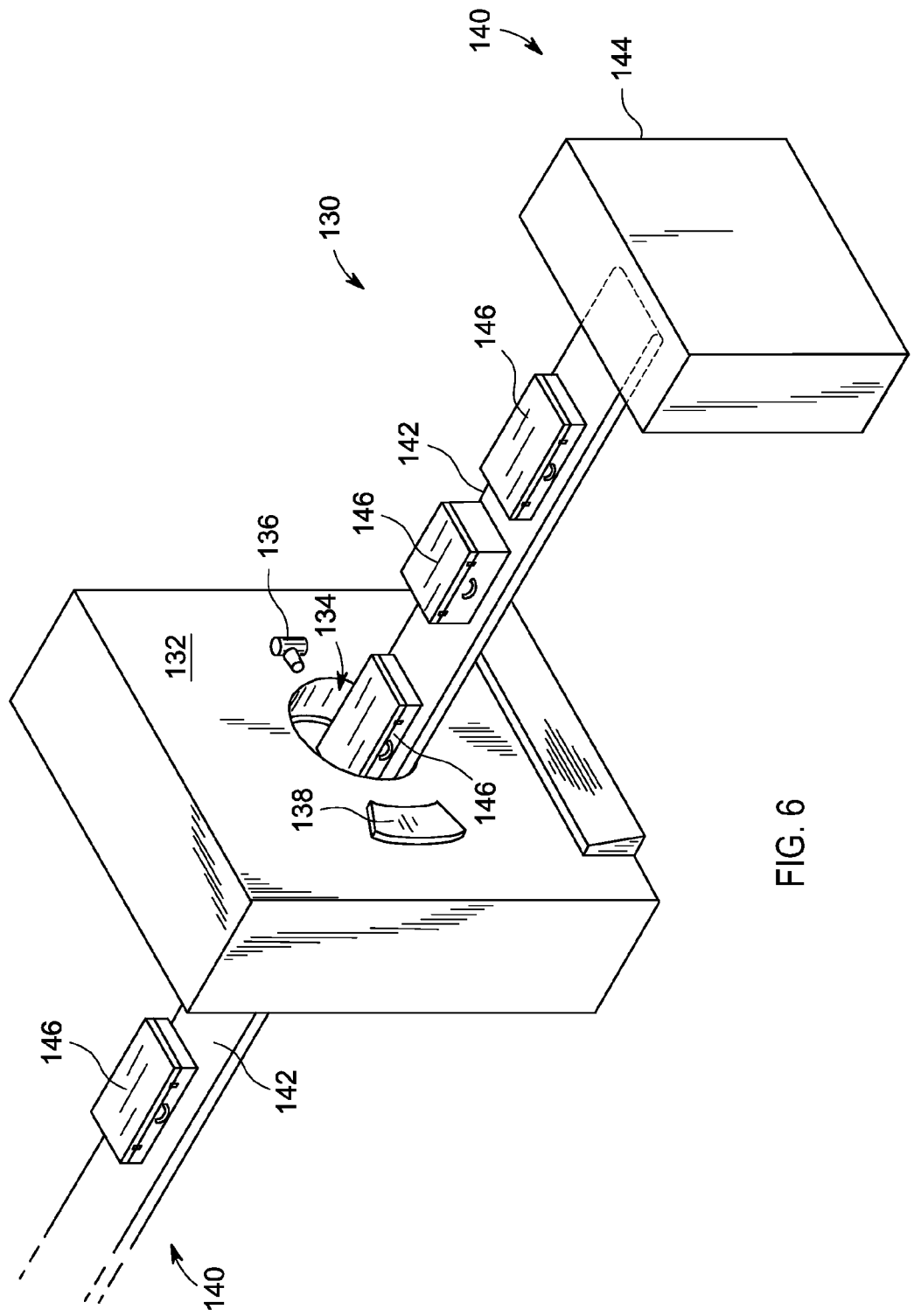
FIG. 6 is a pictorial view of a CT system for use with a non-invasive package inspection system.

Referring now to FIG. 6, package/baggage inspection system 130 includes a rotatable gantry 132 having an opening 134 therein through which packages or pieces of baggage may pass. The rotatable gantry 132 houses a high frequency electromagnetic energy source 136 as well as a detector assembly 138 having scintillator or direct-conversion arrays. A conveyor system 140 is also provided and includes a conveyor belt 142 supported by structure 144 to automatically and continuously pass packages or baggage pieces 146 through opening 134 to be scanned. Objects 146 are fed through opening 134 by conveyor belt 142, imaging data is then acquired, and the conveyor belt 142 removes the packages 146 from opening 134 in a controlled and continuous manner. As a result, postal inspectors, baggage handlers, and other security personnel may non-invasively inspect the contents of packages 146 for explosives, knives, guns, contraband, etc.

One skilled in the art will appreciate that embodiments of the invention may be interfaced to and controlled by a computer readable storage medium having stored thereon a computer program. The computer readable storage medium includes a plurality of components such as one or more of electronic components, hardware components, and/or computer software components. These components may include one or more computer readable storage media that generally stores instructions such as software, firmware and/or assembly language for performing one or more portions of one or more implementations or embodiments of a sequence. These computer readable storage media are generally non-transitory and/or tangible. Examples of such a computer readable storage medium include a recordable data storage medium of a computer and/or storage device. The computer readable storage media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or electronic memory. Other forms of non-transitory and/or tangible computer readable storage media not list may be employed with embodiments of the invention.

A number of such components can be combined or divided in an implementation of a system. Further, such components may include a set and/or series of computer instructions written in or implemented with any of a number of programming languages, as will be appreciated by those skilled in the art. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

A technical contribution for the disclosed method and apparatus is that it provides for a computer implemented iterative resolution recovery in diagnostic imaging.

According to one embodiment of the invention, a non-transitory computer readable storage medium having stored thereon a computer program comprising instructions, which when executed by a computer, cause the computer to acquire an image comprising image data reconstructed from an imaging device. The instructions further cause the computer to apply a bloom reduction algorithm to the image configured to iteratively reduce a blooming of high-density objects in the image.

According to another embodiment of the invention, a method for reducing blooming in an image reconstructed from an imaging device comprises obtaining the image and iteratively applying a bloom-reducing technique to high-density object data in the image to generate a bloom-reduced image. The method also comprises displaying the bloom-reduced image on a display.

According to yet another embodiment of the invention, a CT system comprises a rotatable gantry having an opening to receive an object to be scanned, a high frequency electromagnetic energy projection source configured to project a high frequency electromagnetic energy beam toward the object, and a detector array having a plurality of detector cells wherein each cell is configured to detect high frequency electromagnetic energy passing through the object. The CT system also comprises a data acquisition system (DAS) connected to the detector array and configured to receive outputs from the detector cells and an image reconstructor connected to the DAS and configured to reconstruct an image of the object from the outputs received by the DAS. The CT system further comprises a computer programmed to iteratively reduce a bloom artifact in the reconstructed image caused by reconstructing high-density object data into image data.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A non-transitory computer readable storage medium having stored thereon a computer program comprising instructions, which when executed by a computer, cause the computer to:
   acquire an image comprising image data reconstructed from an imaging device; and
   apply a bloom reduction algorithm to the image configured to iteratively reduce a blooming of high-density objects in the image.

2. The computer readable storage medium of claim 1 wherein the instructions further cause the computer to:
   cause an x-ray source to emit x-rays toward an imaging object;
   receive the emitted x-rays in an x-ray detector; and
   reconstruct the received x-rays into the image.

3. The computer readable storage medium of claim 2 wherein the instructions further cause the computer to:
   rotate the x-ray source and the x-ray detector about a gantry; and
   translate the imaging object through a bore of the gantry.

4. The computer readable storage medium of claim 1 wherein the instructions that cause the computer to apply the bloom reduction algorithm cause the computer to separate high-density object data in the image from soft tissue data in the image.

5. The computer readable storage medium of claim 4 wherein the instructions that cause the computer to separate the high-density object data from the soft tissue data, cause the computer to calculate a normalized local variation, $\tau(x, y)$, by the equation:

$$\tau(x, y) = \frac{\sigma(x, y) - \lambda_L \xi}{(\lambda_H - \lambda_L)\xi},$$

where $\sigma(x, y)$ is a measured standard deviation at a pixel location $(x, y)$, $\xi$ is a global noise estimate for the entire image, where lamda-$_L$ and lamda-$_H$ are parameters determined based on experimental values, and $0 \leq \tau(x, y) \leq 1$.

6. The computer readable storage medium of claim 4 wherein the instructions that cause the computer to separate the high-density object data from the soft tissue data cause the computer to apply a fuzzy logic algorithm.

7. The computer readable storage medium of claim 4 wherein the instructions that cause the computer to separate the high-density object data from the soft tissue data cause the computer to accept a user input identifying a region of high-density object data in the image.

8. The computer readable storage medium of claim 7 wherein the instructions further cause the computer to apply a region-growing algorithm to a region of the image identified by the user.

9. The computer readable storage medium of claim 4 wherein the instructions that cause the computer to separate the high-density object data from the soft tissue data cause the computer to determine a location of a high-density object in the image using dual-energy x-ray data.

10. The computer readable storage medium of claim 4 wherein the instructions that cause the computer to apply the bloom reduction algorithm further cause the computer to apply a signal intensity modification algorithm that causes the computer to:
    determine a trend of signal intensities about each image pixel that corresponds with the high-density object data in the image; and
    if the trend of signal intensities about a respective image pixel is one of ascending and descending, then the instructions further cause the computer to modify the signal intensity of the respective image pixel.

11. The computer readable storage medium of claim 10 wherein the instructions that cause the computer to modify the signal intensity of the respective image pixel cause the computer to apply the following equation to the respective image pixel:

$$\frac{\partial p_t(x, y)}{\partial t} = -\alpha \tau(x, y) |\nabla p_t(x, y)| G[\beta \nabla (x, y, t)^2],$$

where p(x, y) is the respective image pixel, t is a variable representing an iteration, $\nabla$ is a gradient operator at the respective image pixel along a testing direction, $\alpha$ is a correction strength adjustment parameter, (x, y, t) are known parameters obtained from a point spread function of an image reconstruction system used to reconstruct the image, G is a monotonically decreasing function, and $\beta$ is defined by the following equation:

$$\beta = \left(\frac{s\sigma_R}{\mu_C - \mu_W}\right)^2,$$

where, s is an imperially determined scaling variable, $\sigma_R$ is a reference noise level, $\mu_W$ is the CT number of water, and $\mu_c$ is the CT number for high-density objects.

12. The computer readable storage medium of claim 10 wherein the instructions further cause the computer to apply the signal intensity modification algorithm in multiple iterations.

13. The computer readable storage medium of claim 1 wherein the instructions further cause the computer to reconstruct a second image based on the image data in the bloom-reduced image.

14. A method for reducing blooming in an image reconstructed from an imaging device comprising:
    obtaining the image;
    iteratively applying a bloom-reducing technique to high-density object data in the image to generate a bloom-reduced image; and
    displaying the bloom-reduced image on a display.

15. The method of claim 14 further comprising:
    identifying pixels corresponding to the high-density object data; and
    wherein the bloom-reducing technique comprises, for each pixel:
        determining a plurality of trends of signal intensities along respective trend directions in a neighborhood of the pixel; and
        modifying a signal intensity of the pixel if one of the plurality of trends indicates that the signal intensities of image pixels along the corresponding trend direction is one of ascending and descending.

16. The method of claim 15 wherein iteratively applying the bloom-reducing technique comprises applying the bloom-reducing technique to all the pixels corresponding to the high-density object data multiple times until one of a threshold has been reached and the bloom-reducing technique has been applied a predetermined number of times.

17. The method of claim 16 further comprising determining that the threshold has been reached by calculating a change between a previous iteration and a subsequent iteration.

18. A CT system comprising:
    a rotatable gantry having an opening to receive an object to be scanned;
    a high frequency electromagnetic energy projection source configured to project a high frequency electromagnetic energy beam toward the object;
    a detector array having a plurality of detector cells wherein each cell is configured to detect high frequency electromagnetic energy passing through the object;
    a data acquisition system (DAS) connected to the detector array and configured to receive outputs from the detector cells;
    an image reconstructor connected to the DAS and configured to reconstruct an image of the object from the outputs received by the DAS; and
    a computer programmed to:
        iteratively reduce a bloom artifact in the reconstructed image caused by reconstructing high-density object data into image data.

19. The CT system of claim 18 wherein the computer is further programmed to identify pixels corresponding to the high-density object data in the reconstructed image; and
    wherein the computer, in being programmed to iteratively reduce the bloom artifact, is programmed to:
        determine a plurality of trends of signal intensities along respective trend directions in a neighborhood of each identified pixel; and
        if one of the plurality of trends indicates that the signal intensities of image pixels along the corresponding trend direction is one of ascending and descending, then modify a signal intensity of each respective identified pixel.

20. The CT system of claim 19 wherein the computer is programmed to modify the signal intensity by applying the following equation to the respective identified pixel:

$$\frac{\partial p_t(x, y)}{\partial t} = -\alpha \tau(x, y) |\nabla p_t(x, y)| G[\beta \nabla (x, y, t)^2],$$

where p(x, y) is the respective image pixel, t is a variable representing an iteration, $\nabla$ is a gradient operator at the respective image pixel along a testing direction, $\alpha$ is a correction strength adjustment parameter, (x, y, t) are known parameters obtained from a point spread function of an image reconstruction system used to reconstruct the image, G is a monotonically decreasing function, and $\beta$ is defined by the following equation:

$$\beta = \left(\frac{s\sigma_R}{\mu_C - \mu_W}\right)^2,$$

where s is an imperially determined scaling variable, $\sigma_R$ is a reference noise level, $\mu_W$ is the CT number of water, and $\mu_C$ is the CT number for high-density objects.

* * * * *